(12) United States Patent
Reutelingsperger

(10) Patent No.: US 12,195,649 B2
(45) Date of Patent: Jan. 14, 2025

(54) METHOD TO REMOVABLY CONNECT A CARPET PRODUCT TO A SURFACE AND A DOUBLE FACE TAPE FOR USE IN THE METHOD

(71) Applicant: COVESTRO (NETHERLANDS) B.V., Nieuwegein (NL)

(72) Inventor: Chris Reutelingsperger, Nieuwegein (NL)

(73) Assignee: Covestro (Netherlands) B.V., Nieuwegein (NL)

( * ) Notice: Subject to any disclaimer, the term of this patent is extended or adjusted under 35 U.S.C. 154(b) by 452 days.

(21) Appl. No.: 17/605,297

(22) PCT Filed: Apr. 22, 2020

(86) PCT No.: PCT/EP2020/061247
§ 371 (c)(1),
(2) Date: Oct. 21, 2021

(87) PCT Pub. No.: WO2020/216802
PCT Pub. Date: Oct. 29, 2020

(65) Prior Publication Data
US 2022/0243099 A1    Aug. 4, 2022

(30) Foreign Application Priority Data
Apr. 23, 2019    (EP) .................................... 19170681

(51) Int. Cl.
*B29C 65/00*    (2006.01)
*A47G 27/04*    (2006.01)
(Continued)

(52) U.S. Cl.
CPC ............ *C09J 7/35* (2018.01); *A47G 27/0418* (2013.01); *A47G 27/0437* (2013.01);
(Continued)

(58) Field of Classification Search
CPC ..... B29C 65/48; B29C 65/4815; B29C 65/76; C09J 7/35
See application file for complete search history.

(56) References Cited

U.S. PATENT DOCUMENTS 5,691,027 A    11/1997    Eckhardt et al.
7,132,161 B2    11/2006    Knowles et al.
(Continued)

FOREIGN PATENT DOCUMENTS

WO    86/01247    2/1986

*Primary Examiner* — Philip C Tucker
*Assistant Examiner* — Nickolas R Harm
(74) *Attorney, Agent, or Firm* — The Webb Law Firm

(57) ABSTRACT

The invention pertains to a method to removably connect a carpet product having a pile side and a fibrous back side to a surface, wherein the method comprises the step of adhering a double face tape with a first side of the tape to the fibrous back side of the carpet product and connecting the carpet product to the surface by adhering the second side of the double face tape to the surface, the first side of said double face tape is provided with multiple hooks extending from this side and having a length of 0.1-10 mm, and the second side of said double face tape is provided with multiple adhesive nano fibres extending from the second side, each fibre having a distal tip that has a surface extending perpendicular to the longitudinal direction of the fibre, the surface having a diameter of 1-900 nm. The invention also pertains to a carpet product and double face tape for use in the above described method.

13 Claims, 1 Drawing Sheet

Figure 1:
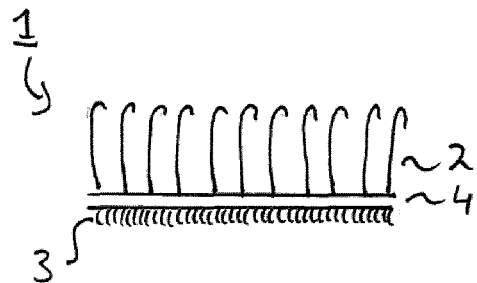

(51) Int. Cl.
*C09J 7/35* (2018.01)
*B29C 65/48* (2006.01)
*B29C 65/76* (2006.01)

(52) U.S. Cl.
CPC .......... *A47G 27/0481* (2013.01); *B29C 65/48* (2013.01); *B29C 65/4815* (2013.01); *B29C 65/76* (2013.01); *C09J 2301/31* (2020.08); *C09J 2467/00* (2013.01); *C09J 2467/006* (2013.01)

(56) References Cited

U.S. PATENT DOCUMENTS

| | | | |
|---|---|---|---|
| 10,421,414 B2* | 9/2019 | Townley | B32B 27/34 |
| 2015/0250271 A1* | 9/2015 | Ogilvie | A44B 18/00 |
| | | | 24/444 |
| 2019/0010646 A1 | 1/2019 | Higgins | |
| 2019/0040283 A1 | 2/2019 | Straumann | |

* cited by examiner

METHOD TO REMOVABLY CONNECT A CARPET PRODUCT TO A SURFACE AND A DOUBLE FACE TAPE FOR USE IN THE METHOD

This application is the U.S. national phase of International Application No. PCT/EP2020/061247 filed 22 Apr. 2020, which designated the U.S. and claims priority to EP patent application Ser. No. 19/170,681.1 filed 23 Apr. 2019, the entire contents of each of which are hereby incorporated by reference.

GENERAL FIELD OF THE INVENTION

The invention in general pertains to the installation of carpet products, i.e. to a method to removably connect a carpet product having a pile side and a back side to a surface.

BACKGROUND OF THE INVENTION

In general there are three types of carpet installation, viz. glue down installation, stretch-in installation and cut-to-fit installation. In all case the installation preferably leads to a removable connection so that the carpet product can be removed when in need of further processing such as recycling (e.g. after being worn), cleaning or relaying to another surface.

Regarding glue down installation, there are two main types of glue down carpet installation, namely directly gluing to a surface, or gluing to a pad that is itself glued to the surface. Direct glue down installation is the most popular carpet installation in commercial settings. In this type of installation, the carpet is glued directly to the floor. 3The floor needs to be very smooth. Any imperfections in the floor will telegraph through the carpet and be visible. Imperfections in the floor may also cause wear spots. Advantages of glued down carpet are that the carpet is solidly supported and has minimal movement. It provides a good solid base which is better for rolling traffic, including wheelchairs. It is suitable for ramps, shows minimal buckling in buildings that have climate control turned off for periods of time and seams do not peak, and are more durable due to lack of flexing. Glue down is suitable for large areas. The main disadvantages of direct glue down is that when replacement is necessary, removal is quite difficult and thus expensive. Using a pad will provide more comfort but apart from the higher initial costs, the main disadvantage remains the same or is even more difficult due to two layers of adhesive being present. A simple alternative for use of regular adhesive in the glue down installation is the use of double face tape. This allows cheap and quick installation but since tape in general does not stick very well to back side of carpet, and also, the floor surface has to be absolutely smooth and free of dust in order to get a good adherence to the floor, this is not an option that is used commonly. It is mainly used for very low-end applications.

Stretch in carpet installation is the most popular installation method in homes. In this installation, strips of wood (called tack-less strip) are nailed (or sometimes glued) to the floor around the edges of the room. These strips have hundreds of nails that are angled in towards the wall. Padding is secured to the floor in the middle of the room. The carpet is then attached to the pins around the room. The installer then stretches the carpet tight across the room. Advantages of stretch in carpet installation are that it is a quick and efficient installation method and it is easier to remove than glued down carpet. Disadvantages are that it is not suitable for very large spaces due to concerns of buckling or rippling and not suitable for heavy rolling traffic, or extensive light duty rolling traffic.

In a cut-to-fit carpet installation an installer will cut the carpet to fit a room exactly, but the carpet is not attached to the floor. Alternatively, carpet tiles are used to fit the surface. The carpet product is laid loosely over the floor. A cut-to-fit installation can be laid directly on the floor, or over a pad. If a pad is used, it should be a firm dense pad (like felt) to minimize the possibility of buckles or ripples. There are several reasons someone may choose to have a loose laid carpet, the most pronounced one being easy removal (after use, wear, for cleaning, drying etc.). However, cut-to-fit carpet installations (or loose-lay carpet installations) are not very stable. Because the carpet product is not attached to the underlying surface, it can shift or move. Changes in weather can affect the size of the carpet. Hot humid weather can cause the fabric to expand, causing ripples. Cool, dry weather can cause the fabric to shrink, leaving gaps. Buckles or ripples may develop, which is not the responsibility of the installer. The reason carpets are glued or stretched in is to avoid these disadvantages. However, the problems can be partly solved by suing carpets having a heavy weight carrier such as a bituminous carrier often used for carpet tiles, mats or runners. Such carpet products however are significantly more expensive.

OBJECT OF THE INVENTION

It is an object of the invention to provide an alternative method for the installation of a carpet product which method at least mitigates some of the prior art disadvantages.

SUMMARY OF THE INVENTION

In order to meet the object of the invention a method to removably connect a carpet product having a pile side and a fibrous back side to a surface is devised, wherein the method comprises the step of adhering a double face tape with a first side of the tape to the fibrous back side of the carpet product and connecting the carpet product to the surface by adhering the second side of the double face tape to the surface, the first side of said double face tape is provided with multiple hooks extending from this side and having a length of 0.1-10 mm, and the second side of said double face tape is provided with multiple adhesive nano fibres extending from the second side, each fibre having a distal tip that has a surface extending perpendicular to the longitudinal direction of the fibre, the surface having a diameter of 1-900 nm.

In the invention a double face tape is used, which as such is known for the installation of carpet products, the novel aspect however is that the double face tap has a complete new constitution that is especially suitable for use with a carpet product that has a fibrous back side, abut suitable for just any surface (even when being wet or dusty or having irregularities), one side of which, i.e. the side which is adhered to the carpet product, in in fact the hairpin side of velcro tape, and the other side of which is a tape commonly known as gecko tape. Applicant found that when using this new type of double face tape, the carpet product can be releasably connected to a surface over and over again, even if the surface does not meet a high standard of smoothness and cleanness. The velcro hair pins are ideally suitable to provide a releasable connection to the fibrous back-side of the carpet products and the gecko tape nano fibres are ideally suitable, not being sticky and easy to clean, to provide a releasable connection to any (regular) surface. By varying the number and size of both the hairpins and/or the nano fibres for example, any strength and durability of the connection can be provided, ranging from an adherence as needed for high end carpet installation to just enough to have an anti-slip connection as needed for example for a bathroom mat on a ceramic tile floor.

Velcro tape is also known as hook tape or burs tape. Like the natural occurring bur (also spelled burr; a seed or dry fruit) that has hooks or teeth, the surface of the tape is provided with multiple tiny hooks, preferably of a synthetic polymer. With velcro, the "mating" tape is a woven or non woven textile product. In the current method the fibrous carpet product takes this function so that the hooks can mechanically engage the carpet product. The hooks can be of any material, such as synthetic nylon, polyester, polypropylene, aramid, but may also be of metal such as stainless steel. The density at which the hooks are placed is typically 1-100 per mm, such as 4-40 per mm.

Gecko tape is commonly known as nano fiber adhesive structure or nano hair adhesive structure. Mostly the tape is simply referred to as gecko tape. The number of fibre tips is typically around 100,000 to 1,000,000 but may be up to or even above 10,000,000 per mm2. There is no minimum in the number of fibre tips, the used number depends i.a. on the required strength for the connection. However, a number below 1000 is believed to be impractical to arrive at a useful connection for a caret product. The diameter of tip is between 1-900 nm, for example less than 800, 700, 600 or 500 nm, or even less than 250 nm, such as for example between 50-200 nm. The length of the nano fibres is typically above 0.1 μm (micrometer), typically between 1 and 1000 μm, preferably 2-900 μm, such as between 5 and 500 μm. The diameter of the fibres is not critical as long as the tips meet the diameter limitation and a minimum of 1000 tips per mm2 is reached. The fibres may be completely individual or they may be bundled, bundles may have diameters up to 100 μm, typically between 1 and 10 μm. Each fibre may have multiple tips.

The gecko tape is derived from the way a gecko's foot is construed. A gecko's foot has toepads consisting of about half a million setae made of keratin. Each of these fine hairs has hundreds of even smaller projections of nanoscale diameters called spatulae protruding from their ends. These spatulae are the nano fibres as defined in the present application. While many interactions had been hypothesized as the origin of the adhesion, such as suction, friction, and electrostatic forces, it was not until 2000 that Robert Full of the University of California, Berkeley, discovered that the adhesion was due to van der Waals forces created between the spatulae and the surface. Van der Waals forces are intermolecular forces created by induced polarizations of molecules. Though weak and negligible in most considerations, van der Waals forces become significant on the micro and nanoscale. In the case of gecko feet, the spatulae are so small and get so close to the surface that an attractive van der Waals force of around 0.4 μN develops between a single spatula and a surface. While a seemingly insignificant number, the combined force of the millions of spatulae on a single gecko foot produce an adhesion force of around 10 N, or around 2.25 lbs. Considering a gecko foot has an area around only 100 mm$^2$, it was inevitable that scientists would attempt to mimic the power and adhering efficiency of such a material.

It was later discovered that van der Waals forces are not the only forces responsible for a gecko's ability. It was discovered that capillary forces may also contribute to the adhesion. Capillary forces are attractive forces created by the surface tension of a molecular layer of absorbed water that forms between two surfaces. When a gecko is climbing on a hydrophilic surface, capillary forces combine with van der Waals forces to keep the gecko in place. On hydrophobic surfaces, however, van der Waals forces play the primary role.

The low detachment force, self-cleaning properties and non-sticky default state of the nano fibre tips suggest hard polymers or materials, rather than the soft polymers which are typically used in pressure sensitive adhesives, for synthesizing the nano fibres which are in fact artificial spatulae/setae. In the first developments of artificial setae, polymers like polyimide, polypropylene and polydimethylsiloxane (PDMS) were frequently used since they are flexible and easily fabricated. Later, as nanotechnology rapidly developed, carbon nanotubes (CNTs) became preferred by most research groups and used in most recent projects since CNTs have much larger possible length-to-diameter ratio than polymers, and they exhibit both strength and flexibility, as well as good electrical properties. A number of microelectromechanical (MEMS) fabrication techniques are applied to the fabrication of synthetic setae, which include photolithography/electron beam lithography, plasma etching deep reactive ion etching (DRIE), chemical vapor deposition (CVD) and micro-molding.

Apart from the above method, the present invention also pertains to the carpet product. This product having a pile side and a fibrous back side, to which back side a double face tape is adhered with a first side of that tape, the first side of said double face tape is provided with multiple hooks extending from this side and having a length of 0.1-10 mm, and the second side of said double face tape is provided with multiple adhesive nano fibres extending from the second side, each fibre having a distal tip that has a surface extending perpendicular to the longitudinal direction of the fibre, the surface having a diameter of 1-900 nm.

Next to this, applicant realised that the newly devised tape can have more applications than just removably connecting a carpet product and thus, the invention also pertains to the double face tape as such. This tape having a first side which is provided with multiple hooks extending from this side and having a length of 0.1-10 mm, and a second side which is provided with multiple adhesive nano fibres extending from the second side, each fibre having a distal tip that has a surface running in parallel with the tape, the surface having a diameter of 1-900 nm.

Definitions

A nano fibre is an elongated rod having at least one dimension in the nano meter range (between 0.1 and 1000 nm), this dimension typically being the diameter of the rod near or at the distal end.

A carpet product is a textile product that is used to cover at least part of a floor, wall or other surface of an object, the product having a face side comprising a pile of yarns extending from a dimensionally stable carrier, which product is used to cover surfaces of any kind (e.g. floors, walls, interiors of vehicles), as a primary covering of this surface or as secondary covering (i.e. to overlay a primary covering). Typical examples of carpet products are broad loom carpet, carpet tiles, entrance mats, car mats, airplane and boat mats and runners. Carpet products can be of various different constructions such as woven, needle felted, knotted, tufted and/or embroidered, though tufted products are the most common type. The pile may for example be cut (as in a plush carpet) or form loops (as in a Berber carpet).

Fibrous means consisting basically out of fibres. "Basically" in this sense means that the basic mechanical constitution is arranged out of fibres: the fibres may however be impregnated or otherwise treated or combined with a non-fibrous material such that the end material also comprises other constituents than fibres. Typical fibrous sheets are woven and non-woven textile products, or combinations thereof.

The diameter of a surface is the largest length in this surface. So if the surface is circular, the diameter is the actual geometrical diameter. If the surface is a square, the diameter is 1.41 times the width of the square.

A product that is made of a polymer means, that the basic constituent of the product is the polymer, the polymer thus being present at over 50 weight percent of the product, typically over 60, 65, 70, 75, 80, 81, 82, 83, 84, 85, 86, 87, 88, 89, 90, 91, 92, 93, 94, 95, 96, 97, 98, 99 up to 100 weight percent.

To connect two objects means to establish an operative connection between the objects that is able to resist at least some separation force. A low level of connection is a connection that is able to provide an anti-slip relationship between two objects, i.e. a connection that is able to resist a shear force between the objects (a force along the connection plane between the objects).

A hot melt adhesive is a thermoplastic adhesive that is designed to be melted, i.e. heated to transform from a solid state into a liquid state to adhere materials after solidification. Hot melt adhesives typically are non-reactive, at least partly crystalline (25-100%) and comprise low (below 10, 5, 4, 3, 2, 1 weight %) or no amount of solvents, so curing and drying are typically not necessary in order to provide adequate adhesion.

EMBODIMENTS OF THE INVENTION

In an embodiment of the method according to the invention the fibrous back side of the carpet product is partly covered with the double face tape. Applicant found that for many applications it is advantageous and sufficient to cover only part of the back surface with the new tape. In particular, the stronger the adherence properties of the gecko side of the tape is, the less surface needs to be covered. Apart from being less expensive this has the advantage that the tape is easier to remove form the carpet product. For example, the fibrous back side of the carpet product is covered adjacent its circumference.

In another embodiment, after a period of time during which the carpet product is connected, the carpet product is removed from the surface and thereafter processed, such as recycled, cleaned, dried or installed at a remote surface. In an embodiment, before the carpet product is processed the double face tape is removed from the fibrous back side of the carpet product. This may be advantageous if the process negatively influences the properties of the double face tape.

In an embodiment of the double face tape itself, both the hooks and fibres are made of synthetic polymer, preferably the hooks and fibres are made of polyester. Polyester is abundantly present in the present-day society (in particular polyethylene terephthalate or PET), easy to produce and easy to recycle. It was found that polyester is suitable both for producing the hooks and the nano fibres.

In another embodiment of the double face tape, the tape comprises two separate layers, the first layer carrying the hooks and the second layer carrying the nano fibres, wherein the layers are mechanically connected using an intermediate hot melt adhesive. It was found that a hot melt adhesive is ideally suitable to durably connect the two layers of the tape while at the same time enabling easy separation of the individual by simply heating the hot melt adhesive above its melting temperature. This enables easy production of separate Velcro and gecko tape and thereafter connecting the two materials to form the new double face tape. Preferably the hot melt adhesive is a polyester adhesive.

The invention will now be further explained using the following examples.

EXAMPLES

FIG. 1 schematically depicts a double face tape according to the invention.

Figure 2:
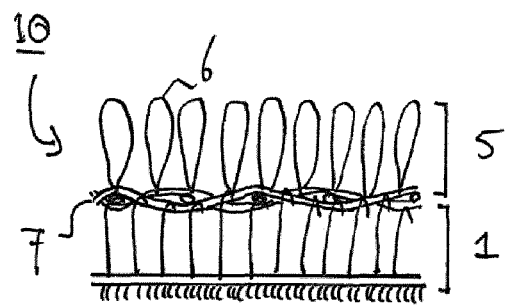

FIG. 2 schematically depicts a carpet product according to the invention.

Figure 3:
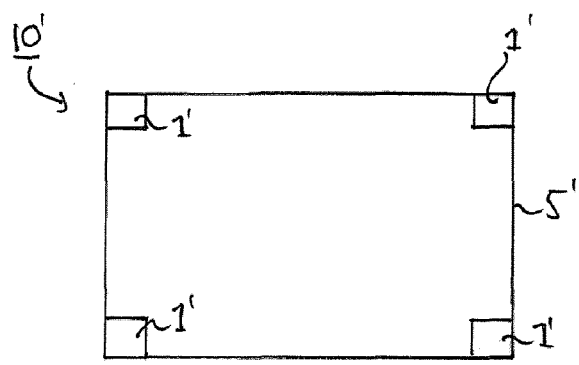

FIG. 3 schematically depicts a bathroom mat according to the invention.

FIG. 1

FIG. 1 schematically depicts a double face tape 1 according to the invention. A first side of the tape is in fact separate velcro tape provided with multiple polyester hooks 2 extending from this side and having a length of 1 mm. The second side of the tape is in fact separate gecko tape, provided with multiple polyester nano fibres 3, each fibre having a distal tip that has a surface running in parallel with the tape. The fibres are about 2 µm long, with a tip diameter of around 400 nm and a periodicity of 1.6 µm. The velcro tape is connected to the gecko tape by an intermediate layer 4 of a polyester hot melt adhesive.

FIG. 2

FIG. 2 schematically depicts a carpet product 10 according to the invention. The carpet product 10 has a pile side 6 and a fibrous back side 7, to which back side a double face tape 1 as depicted in FIG. 1 is adhered.

FIG. 3

FIG. 3 schematically depicts the back of a bathroom mat 10' according to the invention. The mat 10' has 4 pieces 5' of the double face tape according to the invention adhered to its respective corners. In this case, the gecko side of the double face tape has low adherence properties, just enough to provide anti-slip properties to the mat when lying on a bathroom floor composed of ceramic tiles. When the mat needs to be washed, the mat is removed form the floor and the pieces of tape are optionally removed from the mat. If the tape is dirty and the velcro side adheres strongly enough to the mat, the double face tape may also be left in place when the mat is washed in a regular washing machine. After washing and drying, the mat is simply reinstalled in the bathroom, optionally after putting the double face tape back onto the back of the mat. This process can be repeated a very large number of times before the adherence properties of the double face tape fall below a practical minimum.

The invention claimed is:

1. A method to removably connect a carpet product having a pile side and a fibrous back side to a surface, wherein the method comprises the step of adhering a double face tape with a first side of the tape to the fibrous back side of the carpet product and connecting the carpet product to the surface by adhering a second side of the double face tape to the surface, the first side of said double face tape is provided with multiple hooks extending from the first side and having a length of 0.1-10 mm, and the second side of said double face tape is provided with multiple adhesive nano fibres extending from the second side, each fibre having a distal tip that has a surface extending perpendicular to the longitudinal direction of the fibre, the surface of the distal tip having a diameter of 1-900 nm.

2. A method according to claim 1, wherein the fibrous back side of the carpet product is partly covered with the double face tape.

3. A method according to claim 2, wherein the fibrous back side of the carpet product is covered adjacent its circumference.

4. A method according to claim 1, wherein after a period of time during which the carpet product is connected, the carpet product is removed from the surface and thereafter processed.

5. A method according to claim 4, wherein before the carpet product is processed the double face tape is removed from the fibrous back side of the carpet product.

6. A carpet product having a pile side and a fibrous back side, to which fibrous back side a double face tape is adhered with a first side of that double face tape, the first side of said double face tape is provided with multiple hooks extending from the first side and having a length of 0.1-10 mm, and a second side of said double face tape is provided with multiple adhesive nano fibres extending from the second side, each fibre having a distal tip that has a surface extending perpendicular to the longitudinal direction of the fibre, the surface having a diameter of 1-900 nm.

7. A carpet product according to claim 6, wherein the fibrous back side of the carpet product is partly covered with the double face tape.

8. A carpet product according to claim 7, wherein the fibrous back side of the carpet product is covered adjacent its circumference.

9. Double face tape, a first side of which tape is provided with multiple hooks extending from the first side and having a length of 0.1-10 mm, a second side of which is provided with multiple adhesive nano fibres extending from the second side, each fibre having a distal tip that has a surface running in parallel with the tape, the surface having a diameter of 1-900 nm.

10. A double face tape according to claim 9, wherein both the hooks and fibres are made of synthetic polymer.

11. A double face tape according to claim 10, wherein the hooks and fibres are made of polyester.

12. A double face tape according to claim 9, wherein the tape comprises two separate layers, a first layer carrying the hooks and a second layer carrying the nano fibres, wherein the layers are mechanically connected using an intermediate hot melt adhesive.

13. A double face tape according to claim 12, wherein the hot melt adhesive is a polyester adhesive.

* * * * *

UNITED STATES PATENT AND TRADEMARK OFFICE
CERTIFICATE OF CORRECTION

| | | |
|---|---|---|
| PATENT NO. | : 12,195,649 B2 | Page 1 of 1 |
| APPLICATION NO. | : 17/605297 | |
| DATED | : January 14, 2025 | |
| INVENTOR(S) | : Chris Reutelingsperger | |

It is certified that error appears in the above-identified patent and that said Letters Patent is hereby corrected as shown below:

In the Specification

Column 1, Line 9, delete "19/170,681.1" and insert -- 19170681.1 --

Signed and Sealed this
Eighteenth Day of March, 2025

Coke Morgan Stewart
*Acting Director of the United States Patent and Trademark Office*